United States Patent [19]

Nava

[11] 4,385,811
[45] May 31, 1983

[54] REARVIEW DEVICE INCORPORABLE IN HELMETS

[76] Inventor: Pier L. Nava, Verderio Superiore, Como, Italy

[21] Appl. No.: 251,799

[22] Filed: Apr. 7, 1981

[51] Int. Cl.³ .................. G02B 23/02; G02B 23/16
[52] U.S. Cl. .................................. 350/569; 350/297; 350/298
[58] Field of Search ............... 350/45, 48, 54, 298, 350/301, 302, 297, 174, 72, 8, 447, 286, 287, 540, 569

[56] References Cited

U.S. PATENT DOCUMENTS

| 3,043,195 | 7/1962 | Moultrie | 350/302 |
| 3,229,580 | 1/1966 | Mitchell | 350/302 |

FOREIGN PATENT DOCUMENTS

| 743180 | 3/1933 | France | 350/302 |
| 229442 | 7/1976 | France | 350/52 |
| 2430206 | 2/1980 | France | 350/298 |

Primary Examiner—Jon W. Henry
Attorney, Agent, or Firm—Ladas & Parry

[57] ABSTRACT

A rearview device for a headpiece comprises an optical system which is mountable on the headpiece and includes an objective lens which is directed rearwardly of the wearer of the headpiece for receiving light from an object to the rear of the wearer and forming an image of the object. An eyepiece lens enables the wearer of the headpiece to view the image. Laterally and vertically inverting reflectors in the path of light rays passing through the objective lens and the eyepiece lens ensure that the image of the object that is viewed by the wearer is erect and without inversion. A deflecting member is disposed in the path of light rays passing from the objective lens to the eyepiece lens for deflecting the light rays to follow a convexly angled path without affecting the orientation of the image.

4 Claims, 5 Drawing Figures

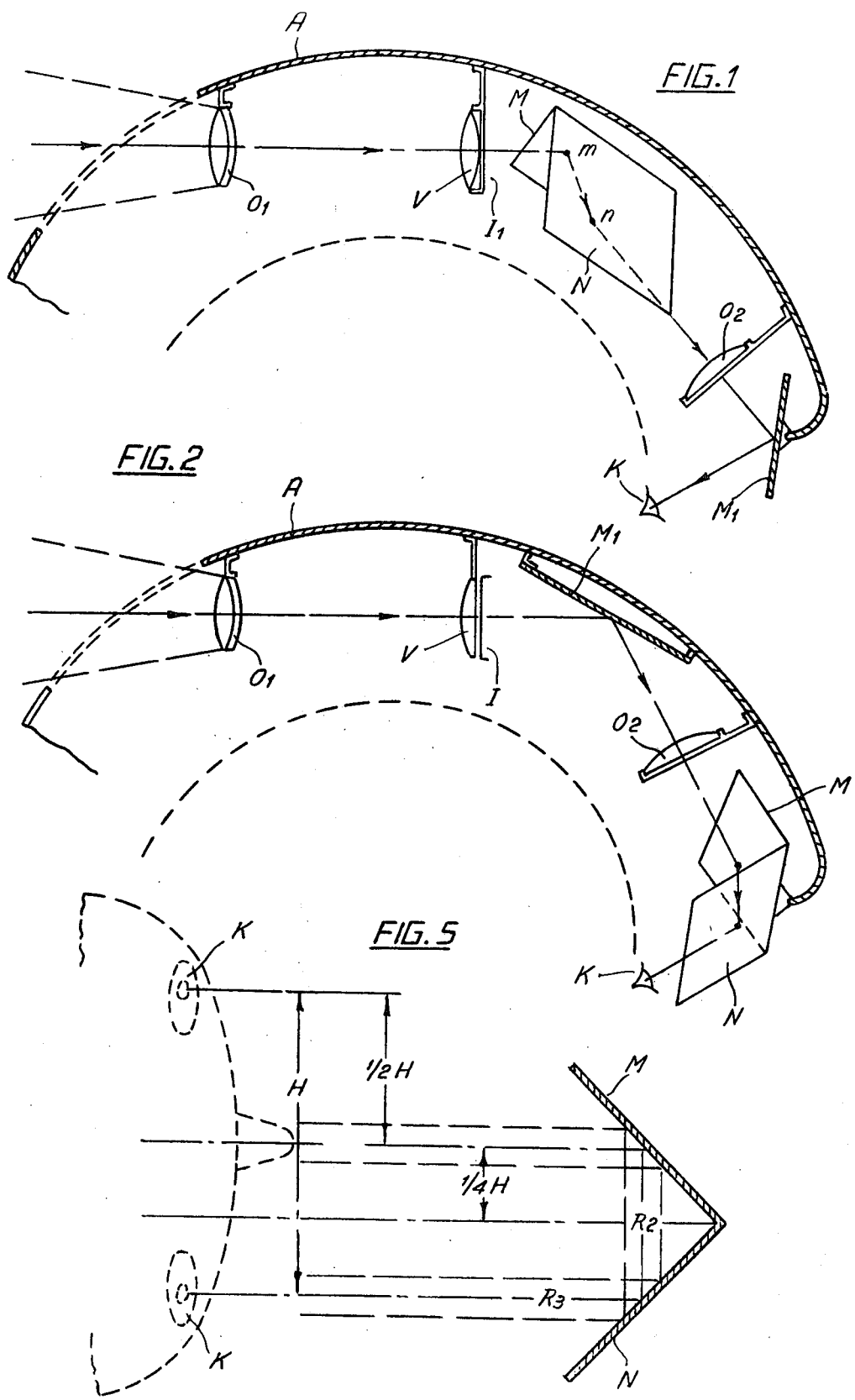

REARVIEW DEVICE INCORPORABLE IN HELMETS

This is a divisional application of U.S. patent application Ser. No. 06/193,991 filed on Oct. 6, 1980.

The present invention relates to a rearview device for incorporation in helmets and the like, for example in protective helmets used by motorcyclists and for sports in general, with particular reference, but without any limitation, to protective helmets. The increase in road traffic presently causes all vehicle drivers when undertaking a maneuver, e.g. when turning or overtaking, to locate exactly all the vehicles that follow precede.

In the case of enclosed vehicles, rearview mirrors applied inside the vehicle enable the driver, by means of a slight inclination of the head, to explore rearwards a field covering an angle of about 30° and to observe the vehicles in the field of vision. Generally these rearview mirrors are complemented by a second rearview mirror, applied externally to the vehicle, the field of which completes that of the first rearview mirror, permitting the driver to "follow", for a few instants, the vehicles that are overtaking him.

Besides these various advantages, such devices present, however, some inconveniences i.e.:

their field of view is fixed and is dependent on the direction of movement of the vehicle;

the protrusion of the external rearview mirror makes this a fragile and dangerous accessory;

the observation through the rearview mirror demands an inclination of the head with consequent momentary distraction of attention from the object situated in front of the driver.

In the case of two-wheeled vehicles, e.g. motorbicycles and motorcycles, the rearview mirror is fixed to the handlebars, whereby all the inconveniences cited hereabove occur.

According to a first aspect of the present invention there is provided a rearview device for a headpiece, said device comprising an optical system which is mountable on the headpiece and comprises an objective lens which, in use, is directed rearwardly of the wearer of the headpiece for receiving light from an object to the rear of the wearer and forming an image of said object, an eyepiece lens for enabling the wearer of the headpiece to view said image, laterally and vertically inverting reflector means in the path of light rays passing through the objective lens and the eyepiece lens so that the image of the object that is viewed by the wearer of the headpiece is erect and without inversion, and at least one defecting member which is disposed in the path of light rays passing from the objective lens to the eyepiece lens for deflecting said rays to follow a convexly angled path without affecting the orientation of the image.

According to a second aspect of the present invention there is provided a rearview headpiece comprising an optical system and means for supporting the optical system on the head of a wearer, said optical system comprising an objective lens which, in use, is directed rearwardly of the wearer of the headpiece for receiving light from an object to the rear of the wearer and forming an image of said object, an eyepiece lens for enabling the wearer of the headpiece to view said image, laterally and vertically inverting reflector means in the path of light passing through the objective lens and the eyepiece lens so that the image of the object that is viewed by the wearer of the headpiece is erect and without inversion, and at least one deflecting member which is disposed in the path of light rays passing from the objective lens to the eyepiece lens for deflecting said rays to follow a convexly angled path without affecting the orientation of the image.

For a better understanding of the invention, and to show how the same may be carried into effect, reference will now be made, by way of example to the accompanying drawings in which:

FIG. 1 shows a side view, partly in elevation and partly in section, of a first helmet provided with a rearview device and not embodying the present invention;

FIG. 2 shows a view similar to FIG. 1 of a second helmet provided with a rearview device and not embodying the present invention;

FIG. 5 shows the path of light rays through a part of the rearview device.

In the various figures of the drawings, like components are provided with like reference characters.

Figure 3:
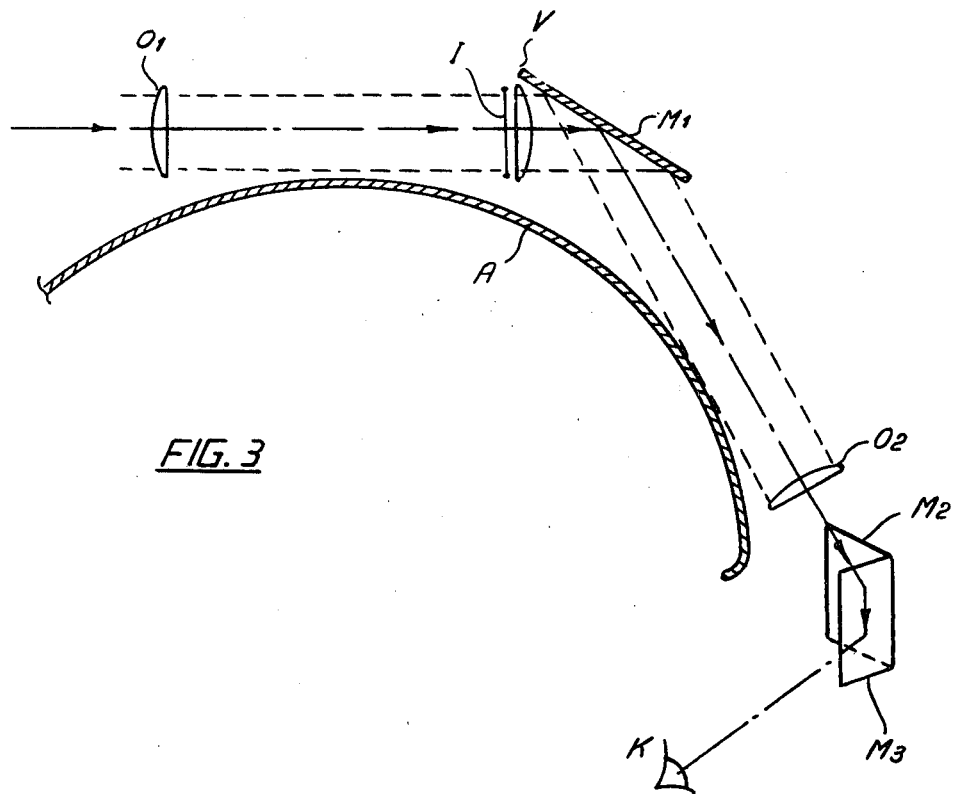
FIG. 3 shows a first modification of FIG. 2, not embodying the present invention.
Figure 4:
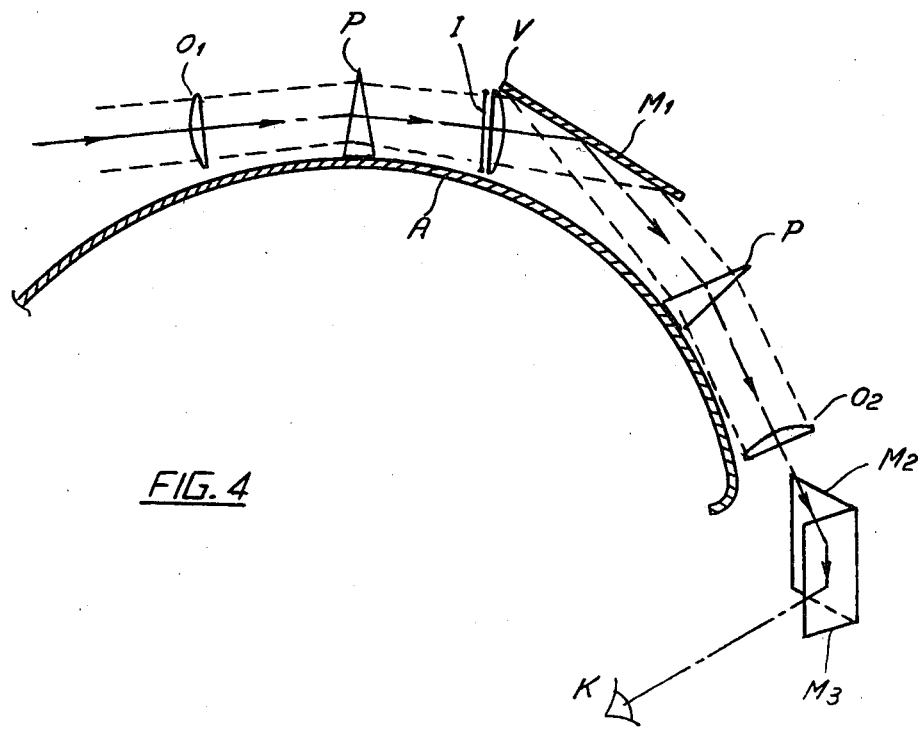
FIG. 4 shows a second modification of FIG. 2, embodying the present invention.

Each of FIGS. 1 and 2 illustrates the outer shell of a helmet A, for example a motorcyclist's safety helmet. The helmet A is formed near the top thereof with an aperture $A_1$ directed towards the rear of the helmet. Mounted inside the helmet, in the space available between the wearer's head (shown in dashed lines) and the shell, is a rearview device. Each of FIGS. 3 and 4 illustrates the shell of a helmet A, and a rearview device mounted outside the helmet.

Each of the rearview devices comprises an objective lens $O_1$ which is supported with its optical axis substantially horizontal and is arranged to receive light from a distant object (not shown) to the rear of the wearer of the helmet and to form an image $I_1$ of that object, and an eyepiece lens $O_2$ which enables the wearer of the helmet to view the image $I_1$ (or an image thereof).

In the case of FIG. 1, the objective lens forms at its focal plane a laterally and vertically inverted image $I_1$ of a distant object. The field lens V is placed at the focal plane of the lens $O_1$. The objective lens $O_1$ and the field lens V are geometrically coaxial, the common axis of the lenses lying in a vertical plane which bisects the helmet in the front and rear direction. Immediately downstream of the field lens V is a pair of plane mirrors M,N disposed at right angles to each other and meeting in a line which lies in a plane parallel to the vertical plane containing the common axes of the objective $O_1$ and the field lens V, and spaced therefrom by a distance equal to ¼ the normal distance between the optical axes of the eyes. The mirror M,N thus result in the optical axis of the system downstream of the mirrors being displaced laterally from the aforesaid vertical plane by a distance equal to half the normal distance between the optical axes of the eyes, and therefore, assuming that the vertical plane containing the axes of the objective $O_1$ and the field lens V lies halfway between the optical axes of the eyes, the vertical plane containing the optical axis of the system downstream of the mirrors M,N also contains the optical axis of one of the eyes.

The light beam entering the optical system by way of the objective $O_1$ and reflected by the mirrors M,N passes through the eyepiece $O_2$ and is reflected by the mirror $M_1$ into the eye of the wearer of the helmet. The wearer thus views the image $T_1$. The image as viewed is laterally inverted by the mirrors M,N and is vertically inverted by the mirror $M_1$. Since the image $I_1$ is itself laterally and vertically inverted with respect to the object, the image as viewed by the wearer is erect and without lateral inversion.

The optical system shown in FIG. 2 is similar to that of FIG. 1, except that the positions of the mirror $M_1$ and the mirrors M,N are interchanged, with the result that vertical inversion of the image $I_1$ takes place upstream of the eyepiece $O_2$ and lateral inversion of the image and lateral displacement of the optical axis of the system take place downstream of the eyepiece $O_2$. The planes of the mirrors M,N are substantially vertical and meet in a line which is tilted slightly forwards at the top, as seen in FIG. 2, but lies in a vertical plane which extends parallel to the optical axis of the objective $O_1$.

The system shown in FIG. 3 is similar to that of FIG. 2, except that FIG. 3 shows that the optical system may be mounted outside the helmet, for example as accessories secured to the helmet after manufacture by means not shown, as opposed to being built into the helmet during manufacture.

The system shown in FIG. 4 is similar to that of FIG. 3, except that it includes two prisms P which deviate the light path so that it follows more closely the contours of the exterior of the helmet. The prisms are of small angle, e.g. 15° to 20°, resulting in minimal dispersion of the light passing therethrough.

FIG. 5 illustrates the manner in which the mirrors M,N bring about lateral inversion of a light beam incident thereon and lateral displacement of the axis of the beam.

It will be seen from the foregoing that the present invention may be used to provide a rearview device which can be incorporated within the driver's protective helmet and is able to offer, on the models presently in use, the following advantages:

(A) the field of view towards the rear may be varied at will by means of a simple orientation of the driver's head;

(B) the use of protruding, fragile or dangerous members or parts is not required;

(C) the image is observed close to the normal vision axis, with the overlapping or juxtaposition of the objects located in front and seen without the aid of the device;

(D) this device may be easily fitted to any type of helmet leaving the structural strength of the helmet practically unaltered.

The rearview device presents supporting means which may be fitted to the helmet and which support, in the rear part of the helmet, an objective lens the optical axis of which is generally horizontal, and in the front part, at least an eyepiece, and presents means to optically connect the objective and the eyepiece so as to permit the vision of the rear objects.

In the described helmets, the objective is located in the upper part of the helmet, but it may alternatively be located on one of the side walls of the helmet. The eyepiece is fitted in the front part of the helmet and, obviously, in such a position as to be seen by the eye of the driver.

The optical system of the rearview device has the following characteristics:

the final image observed by the driver through the eyepiece is a "true" one, i.e. the top and bottom, the right and left hand side of the rear object, as seen in the field of view of the eyepiece are maintained;

The optical system which generally follows a profile corresponding to that of the helmet to which the rearview device is connected, is made in such a manner that the elements of said rearview may be easily fitted in the helmet.

The optical systems of the illustrated rearview devices are based upon the principal of the astronomical telescope, whereby the focal plane of the objective $O_1$ lies between the objective and the eyepiece $O_2$ and coincides with the focal plane of the eyepiece. Thus, the image I formed by the objective of a distance object lies in the focal plane of the eyepiece $O_2$ and is viewed at infinity by the user of the device.

Since the field of the objective $O_1$ is large (e.g. about 30°), the field lens V is provided in order to concentrate the light from the objective on the eyepiece, thus allowing observation of the entire field.

The magnification of the optical system is equal to the ratio of the focal length of the objective to the focal length of the eyepiece. In the case of a conventional astrononomical telescope this ratio is normally between 50 and 100; whereas in the case of the illustrated rearview devices it is near to unity, the focal lengths of the lenses being nearly equal.

In the astronomical telescope, the image that is viewed by the user is vertically and laterally inverted. The mirrors of the illustrated rearview devices correct the image so that it is erect and without lateral inversion.

In the device shown in FIG. 1, the focal length of the objective $O_1$ is, for example, 70 mm, so as to form an image having a diameter of about 25 mm.

Downstream of the field lens V, the optical axis is deviated downwards by about 70° by means of the mirrors M,N described above which ensures also the lateral reversal of the image which is directly observed by means of the eyepiece $O_2$. The optical axis is also deviated by means of the mirror $M_1$ to bring it close to the normal vision axis of the driver In the examples of the embodiments previously described, the rearview devices may be duplicated in order to obtain two parallel circuits 65 mm apart, this corresponding to the average distance between the eyes K, of a human, thus ensuring a binocular and stereoscopic vision of the image observed.

Needless to say the rearview devices as described and illustrated hereabove may be modified and adapted with particular reference to the type of helmet to which said rearview device is being applied. Specifically, the rearview device may be either incorporated in the helmet or adapted for attachment to an existing conventional helmet.

I claim:

1. A rearward device for a headpiece, said device comprising an optical system which is mountable on the headpiece said comprises an objective lens which, in use, is directed rearwardly of the wearer of the headpiece for receiving light from an object to the rear of the wearer and forming an image of said object, an eyepiece lens for enabling the wearer of the headpiece to view said image, laterally and vertically inverting reflector means in the path of light rays passing through the objective lens and the eyepiece lens so that the image of the object that is viewed by the wearer of the headpiece is erect and without inversion, and at least one deflecting member which is disposed in the path of light rays passing from the objective lens to the eyepiece lens for deflecting said rays to follow a convexly angled path without affecting the orientation of the image and wherein said optical system includes a field lens which is disposed between the objective lens and the eyepiece lens, a first deflecting member disposed between the objective lens and the field lens and a second deflecting member disposed between the field lens and the eyepiece lens.

2. A device as claimed in claim 1, wherein each said deflecting member is a prism.

3. A rearview headpiece comprising an optical system and means for supporting the optical system on the head of a wearer, said optical system comprising an objective lens which, in use, is directed rearwardly of the wearer of the headpiece for receiving light from an object to the rear of the wearer and forming an image of said object, an eyepiece lens for enabling the wearer of the headpiece to view said image, laterally and vertically inverting reflector means in the path of light passing through the objective lens and the eyepiece lens so that the image of the object that is viewed by the wearer of the headpiece is erect and without inversion, and at least one deflecting member which is disposed in the path of light rays passing from the objective lens to the eyepiece lens for deflecting said rays to follow a convexly angled path without affecting the orientation of the image and wherein said optical system includes a field lens which is disposed between the objective lens and the eyepiece lens, a first deflecting member disposed between the objective lens and the field lens and a second deflecting member disposed between the field lens and the eyepiece lens.

4. A rearview headpiece as claimed in claim 3 wherein each said deflecting member is a prism.

* * * * *